United States Patent [19]

Parish et al.

[11] 4,351,746

[45] Sep. 28, 1982

[54] COMPOUND DISPERSIONS AND FILMS

[75] Inventors: Darrell J. Parish, Stoutsville, Ohio; Robert S. Mallouk, Chadds Ford, Pa.

[73] Assignee: E. I. Du Pont de Nemours and Company, Wilmington, Del.

[21] Appl. No.: 172,998

[22] Filed: Jul. 25, 1980

[51] Int. Cl.$^3$ .............................................. H01B 1/06
[52] U.S. Cl. ..................................... 252/511; 252/502; 523/500; 523/512; 523/513; 523/215; 524/496; 361/311; 361/314
[58] Field of Search ................ 252/511, 502; 260/873, 260/40 R, 42; 428/323, 408, 480, 523; 361/311, 314

[56] References Cited

U.S. PATENT DOCUMENTS

| | | | |
|---|---|---|---|
| 3,405,198 | 10/1968 | Rein et al. | 260/873 |
| 3,435,093 | 3/1969 | Cope | 260/857 |
| 3,579,609 | 5/1971 | Sevenich | 260/873 |
| 3,585,255 | 6/1971 | Sevenich | 260/873 |
| 3,668,172 | 6/1972 | Jones et al. | 260/30.6 R |
| 3,719,729 | 3/1973 | Le Paranthoen et al. | 260/87.3 |
| 3,769,260 | 10/1973 | Segal | 260/40 R |
| 3,923,726 | 12/1975 | Benz | 260/40 |
| 4,010,222 | 3/1977 | Shih | 260/873 |
| 4,174,358 | 11/1979 | Epstein | 525/183 |

FOREIGN PATENT DOCUMENTS 1030335 5/1966 United Kingdom ................ 252/511

Primary Examiner—Joseph L. Schofer
Assistant Examiner—J. L. Barr

[57] ABSTRACT

A dielectric composition is disclosed having three separate phases, one electrically conductive, combined to yield a compound dispersion with high dielectric constant and low dissipation factor. The composition is made into a film and the film is used in electrical capacitors.

11 Claims, No Drawings

COMPOUND DISPERSIONS AND FILMS

BACKGROUND OF THE INVENTION

1. Field of the Invention

This invention relates to compound dispersions of materials and to films made from such dispersions useful in capacitor manufacture and in other applications where high dielectric constants and low dissipation factors are desired. The invention also relates to electrical capacitors made using film of the invention.

2. Summary of the Prior Art

British Pat. No. 1,030,335 published May 18, 1966 discloses that electrically conductive particles can be dispersed in a plastic matrix to improve performance of the plastic in capacitors. While carbon black is the preferred electrically conductive material and polyethylene terephthalate is the preferred plastic matrix material, the carbon black is dispersed directly into the plastic matrix to yield only a two-phase dispersion; and the carbon black must be used in such low concentrations as to assure that the carbon black particles do not make electrical contact.

U.S. Pat. No. 3,668,172 also discloses a dispersion of pigments, including carbon black, in polyethylene terephthalate. In that patent, high and low density homopolymers of ethylene are used as carriers for the pigment. However, the composition is used for spinning pigmented fibers and there is no mention of electrical properties or use of the composition in electrical applications.

U.S. Pat. No. 3,923,726 discloses pigmented blends of polyethylene terephthalate and polyolefins directed solely toward coloring the polyethylene terephthalate. U.S. Pat. Nos. 3,579,609 and 3,405,198 also disclose blends of polyethylene terephthalate and polyolefins but disclose no pigmentation.

Blends of matrix polymers and dispersed polymers are well known, with and without pigmentation. U.S. Pat. Nos. 3,435,093 and 4,010,222 disclose such blends utilizing polyethylene terephthalate as the matrix, ionomers as the dispersed polymer, and teaching that the blends can be modified by addition of pigments, fillers and so forth. U.S. Pat. No. 4,174,358 discloses blends utilizing polyamides as the matrix and a variety of modified polyolefins as the dispersed polymer. There is no disclosure that such addition of materials should be made other than to the blend; and there is no disclosure of the electrical characteristics of any of the blends.

Blends have been previously disclosed to improve the electrical properties of a film material. U.S. Pat. No. 3,585,255 discloses that ionomer blended into polyethylene terephthalate results in a material having a dielectric constant with improved stability in the face of changing temperature and other outside influences. U.S. Pat. No. 3,719,729 discloses a blend of polypropylene in polyethylene terephthalate to increase the resistance of polyethylene terephthalate to electrical breakdown. In neither of these patents is there any mention of a desire to increase the dielectric constant of the material or any teaching that a pigment should be added for any reason.

U.S. Pat. No. 3,769,260 discloses that the impact strength of polyethylene terephthalate is increased by addition, thereto, of carboxyl-terminated olefin polymers or copolymers. There is also disclosure that the strength of the material can be increased even more by addition, to the blend, of fibrous or particulate fillers including carbon and metals. Fillers, when used, are added to the blend rather than to individual components of the blend. There is no mention of electrical properties of the material, filled or not.

DESCRIPTION OF THE INVENTION

Electrical capacitors are manufactured by building a layered structure of alternating conductors and dielectrics. Alternating layers of the conductors are electrically connected to opposite poles and the dielectric serves to insulate neighboring conductor layers and to store electrical energy. The dielectric layer is usually in the form of a film; and thin polyethylene terephthalate film is a good example of generally accepted material.

In capacitors and other uses requiring a high degree of capacitance, the dielectric material must have a high dielectric constant; and, in capacitors for use with alternating current, the material must have a low dissipation factor. For purposes of this invention, the dielectric constant of a material is the ratio of the capacitance of a capacitor when the dielectric is the material under investigation and when the dielectric is air or a vacuum. Thus, more electrical charge or electrical energy will be stored in a capacitor made from material with a high dielectric constant than in a capacitor made from material with a lower dielectric constant.

The dissipation factor of a material is the relative measure of the loss of electrical energy, through heating or by conductivity in the dielectric of a capacitor. A low dissipation factor means that electrical charge will be transferred into and out of a capacitor efficiently and with little loss of energy.

While electrically conductive additives have previously been added, in low concentration, to a single-phase film material to increase the dielectric constant, that electrically conductive additive also increased the dissipation factor and, thus, reduced the value of the film as a dielectric for alternating current capacitors.

Film materials with additives offer a dielectric component with competing qualities for alternating current capacitors and it is a matter of serious concern to choose an acceptable balance of low dissipation factor and increased dielectric constant accompanying certain concentrations of certain additives.

Even with the present invention, the dissipation factor is increased as additives are blended into the film to increase the dielectric constant; but, in films of the present invention, the dissipation factors are much lower and the dielectric constants are much higher than they are in films of the prior art. Films of the present invention are made from a compound dispersion comprising a primary dispersion of electrically conductive particles evenly distributed in a polymeric primary matrix, in turn, evenly distributed in a polyester secondary matrix immiscible with the primary matrix.

For reasons not entirely understood, the complex film of this invention exhibits a high dielectric constant and a relatively low dissipation factor. It has been found that films of the compound dispersion of this invention exhibit dielectric constants greater than 3 and as much as 10 to 12, at 50° C., along with dissipation factors, at 25° C. and 1K Hertz, of 1 to 2% and as low as 0.0025%. The combination of dielectric constants greater than about 3.5 and dissipation factors less than about 0.5% is taken to be a substantial improvement over films of the prior art.

It is believed to be of critical importance that the dispersed particles of the primary dispersion must be substantially all isolated from one another and out of electrical contact; that the primary dispersion, itself, must have a high enough concentration of electrically conductive particles that the electrically conductive particles are in electrical contact, and that substantially all of the electrically conductive particles must be dispersed in the primary matrix with the secondary matrix substantially free of electrically conductive particles. By "substantially free of electrically conductive particles" is meant that less than about 5, and preferably less than 1, weight percent of the electrical conductive particles in the composition are present in the secondary matrix material.

The secondary matrix material is believed to control the gross physical properties for the compound dispersion of this invention. The secondary matrix material should, therefore, exhibit the physical characteristics which are desired in the compound dispersion. The material should be a strong dielectric, have high flexibility and pinhole flex strength,, and have a high tensile strength and modulus. Polyesters have been found to exhibit those characteristics and are preferred as the secondary matrix material of this invention.

Eligible polyesters can be made from dicarboxylic acids or ester-forming derivatives thereof and glycols, and include polyethylene terephthalate, polypropylene terephthalate, polbutylene terephthalate, poly(2,2-dimethyl-1,3-propylene terephthalate), poly(cyclohexane-dimethanol terephthalate), poly(ethylene bibenzoate), and copolyesters of terephthalic acids with an aromatic dicarboxylic acid such as ethylene terephthalate-ethylene isophthalate copolyesters and copolyesters of an aromatic dicarboxylic acid such as terephthalic acid with one or more aliphatic dicarboxylic acids such as adipic acid, sebacic acid, or azelaic acid. Typical aromatic dicarboxylic acids include phthalic acid, isophthalic acid and, terephthalic acid; and typical glycols include ethylene glycol, propylene glycol, hexamethylene glycol, and 1,4-cyclohexane dimethanol. Polyethylene terephthalate is preferred and will, hereafter, be named in reference to all eligible polyesters. The preferred polyethylene terephthalate exhibits an intrinsic viscosity of about 0.5 to at least 1.

The primary matrix material must serve a combination of functions. It must serve as matrix for the dispersed electrically conductive particles and it must serve as the dispersed phase for the compound dispersion. The primary matrix material must permit particle-to-particle electrical contact in the presence of an adequate concentration of electrically conductive particles, and it must be substantially immiscible with the secondary matrix material so as to maintain a two-phase polymer system with isolation of the electrically conductive particles in the primary matrix material. It must also form a bond with the secondary matrix material and be capable of substantial deformation without drawing away from the secondary matrix material, such as during orientation stretching, to leave voids between the phases. Several polymeric materials have been found to exhibit those characteristics. From among the several eligible polymeric materials, polyolefins are preferred as the primary matrix material of this invention.

Because the primary matrix material is to be dispersed in a polyester secondary matrix material, it is believed that a more complete and stable dispersion can be made if molecules of the primary matrix material include some chemical group or groups which have affinity for or are attracted to the polyester molecules. Such groups include carboxylic groups such as acids, esters, anhydrides, and salts; and it is preferred that molecules of the primary matrix material should have one or more of those groups appended thereto.

The particularly preferred primary matrix material is, therefore, an alkylcarboxyl-substituted polyolefin having carboxylic moieties attached thereto, either on the polyolefin backbone itself or on side chains. By "carboxylic moiety" is meant carboxylic groups from the group consisting of acids, esters, anhydrides, and salts. Carboxylic salts are neutralized carboxylic acids and a primary matrix material which includes carboxylic salts as a carboxylic moiety also includes the carboxylic acid of that salt. Such materials are termed ionomeric polymers and, while not specifically preferred, are eligible for use in this invention.

Primary matrix material can be prepared by direct synthesis or by grafting. An example of direct synthesis is the polymerization of an $\partial$-olefin with an olefinic monomer having a carboxylic moiety; and an example of grafting is the addition of a monomer having a carboxylic moiety to a polyolefin backbone. In the material made by grafting, the polyolefin is generally polyethylene or a copolymer of ethylene and at least one $\partial$-olefin of 3–8 carbon atoms such as propylene, and the like, or a copolymer including at least one $\partial$-olefin of 3–8 carbon atoms and a diolefin, such as 1,4-hexadiene, and the like. The polyolefin is reacted with an unsaturated carboxylic acid, anhydride, or ester monomer to obtain the grafted polymer. Representative eligible acids, anhydrides, and esters include: methacrylic acid; acrylic acid; ethacrylic acid; glycidyl methacrylate; 2-hydroxy ethylacrylate; 2-hydroxy ethyl methacrylate; diethyl maleate; monoethyl maleate; di-n-butyl maleate; maleic anhydride; maleic acid; fumaric acid; itaconic acid; succinic acid; monoesters of such dicarboxylic acids; dodecenyl succinic anhydride; 5-norbornene-2-3-anhydride; nadic anhydride (3,6-endomethylene-1,2,3,6-tetrahydrophthalic anhydride); and the like. Generally, the graft polymer will have from about 0.1 to about 15, and preferably about 0.2 to about 10, weight percent monomer component. Grafted polymers are described in greater detail in U.S. Pat. Nos. 4,026,967 and 3,953,655.

In the primary matrix material made by direct synthesis, the polymeric material is a copolymer of an $\partial$-olefin of 2–10 carbon atoms and an $\partial,\beta$-ethylenically unsaturated carboxylic acid, ester, anhydride, or salt having 1 or 2 carboxylic moieties. The directly synthesized material is made up of at least 75 mol percent of the olefin component and from about 0.2 to 25 mol percent of the carboxylic component.

Ionomeric primary matrix material is preferably made from directly synthesized material and is preferably made up of about 85 to 99 mol percent olefin and about 1 to 15 mol percent $\partial,\beta$-ethylenically unsaturated monomer having carboxylic moieties wherein the moieties are considered as acid equivalents and are neutralized with metal ions having valences of 1 to 3, inclusive, where the carboxylic acid equivalent is monocarboxylic, or with metal ions having a valence of 1 where the carboxylic acid equivalent is dicarboxylic. Representative eligible $\partial$-olefins and unsaturated carboxylic acid, anhydride, and ester monomers are those previously herein described. Ionomeric polymers are described in greater detail in U.S. Pat. No. 3,264,272.

The preferred primary matrix material is polyethylene having a density of from 0.94 to 0.97 grams/cc and a melt index of 0.3 to 1.0 with about 1 weight percent succinic acid grafted thereto. After the grafting, the material exhibits a melt index of about 7 to 20. For purposes of this invention, the preferred primary matrix material will be characterized as alkylcarboxyl-substituted polyolefin.

Individual molecules of the alkylcarboxyl-substituted polyolefin will, due to the polyester-attracting groups grafted thereon, be partially soluble in the polyester. Such partial molecular solubility is believed to be more a matter of intermolecular attraction than of mutual miscibility and is believed to result in a stable dispersion rather than a solution of the molten matrix materials. The primary matrix material is, nevertheless, substantially immiscible with the secondary matrix material despite the existence of some intermolecular attractions.

It is believed that the sole function of the electrically conductive particles is to conduct electrical charge within the individual domains of the primary dispersion. To accomplish that function, the electrically conductive particles should be about 0.01 to 20 microns, and preferably about 0.01 to 2 microns, in average diameter, and should be homogeneously dispersed in the primary matrix material without agglomerates. The particles can be of any shape and of any conductive material so long as they are used in a concentration high enough to assure that a substantially completely conducting network of particles is formed in each dispersed domain. While the exact required amount of electrically conductive particles may depend somewhat on the size and shape of the particles, it has been found that the concentrations of as low as about 25 weight percent based on the complete primary dispersion can be adequate but from about 35 to 50 weight percent is preferred. Concentrations as high as about 75 weight percent have been used but little advantage is noted at concentrations of greater than about 50 weight percent. The electrically conductive particles can be elemental metals, carbon, metal oxides, metal carbides, and the like.

Due to variations in the degree of dispersion, insulating coatings, such as oxides, which form on some kinds of material, the effect of different shapes of materials, and the like, the only meaningful conductivity is the conductivity within the primary dispersion itself. Although carbon pigments, such as carbon black and lamp black, may not exhibit the greatest conductivity of materials listed above, they are preferred for use in this invention because they are entirely inert and easily dispersed in the matrix material.

Manufacture of the compound dispersion of this invention requires two separate and distinct dispersing steps. First, the electrically conductive particles are dispersed in the primary matrix material to yield a primary dispersion and then the primary dispersion is dispersed in the secondary matrix material to yield the compound dispersion.

Effectiveness of the compound dispersion is, to a considerable degree, dependent upon the degree of dispersion of the electrically conductive particles in the primary matrix material. The dispersion method must be one which is high shear and vigorous; and can be any of several well-known such methods. For example, such dispersion can be accomplished by: mills, such as a twin-roll mill; extruders, such as a twin-screw extruder with high shear screws; and mixers, such as a Banbury mixer. In present operation, a Banbury mixer is preferred.

Dispersion of the primary dispersion into the secondary matrix material, requires any dispersion process of moderate shear. The dispersion forces must be adequate to break the primary dispersion into particles or domains but not so great as to cause inordinate decrease in the size of the domains with an escape of the electrically conductive particles into the secondary matrix phase. In present operations, a twin-screw extruder with medium shear, corotating, screws is preferred.

Concentration of the primary dispersion in the secondary matrix material must be high enough to be effective and yet not so high that individual domains of the primary dispersion will be in electrical contact. It has been found that any concentration of primary dispersion, no matter how low, will afford some benefit over use of the secondary matrix material alone. As a practical matter, however, the primary dispersion is generally present in the amount of at least about 5 weight percent, based on the complete compound dispersion. Such a concentration provides a composition of excellent processability and substantially increased dielectric constant. The concentration of primary dispersion should generally be maintained below about 20 weight percent based on the complete compound dispersion because, above that concentration, with most systems of materials, the individual domains begin making too many electrical contacts, increasing the likelihood of a short in the material. A concentration of about 10 to 15 weight percent of primary dispersion based on the complete compound dispersion, is preferred.

It is understood, of course, that the limits for concentration of primary dispersion are affected somewhat by the size and shape of the domains of primary dispersion. As to the size, it has been found that the domains in a film of unoriented compound dispersion will be nearly spherical and should be from about 0.1 to 20 microns in average diameter and that about 0.1 to 2.0 microns is preferred.

The composition of the compound dispersion of this invention is usually used as a film of material and, before use, the film is usually oriented by stretching. Stretching, of course, alters the shape of domains of primary dispersion rendering them flatter and elongating them in the direction of the stretching. In the case of biaxially oriented films, the domains will have the general shape of platelets as opposed to the substantially spherical domains of the unoriented films; and the platelets will have the thickness decreased and the flat dimension increased proportionally with the degree of stretching. As a determination of domain size, the average domains, whether platelets or of irregular shape, can be discussed with regard to an average spherical equivalent diameter, as though the material of the domains were in a spherical shape. Due to the requirements of the stretching process, it is important that the primary matrix material should have a melting point which is lower than that of the secondary matrix material. When such is the case, the primary matrix material readily distorts at orientation temperatures for the secondary matrix material, thus avoiding the formation of voids between the phases.

Films of the compound dispersion of this invention can be manufactured in the same manner as films have been manufactured previously and as has been taught previously in the literature. The compound dispersion, once made, can be extruded or pressed into films or sheets; and the films or sheets can be used as they are or they can be oriented by stretching in one or both directions.

The compound dispersion of this invention, used in electrical capacitors, is used exclusively in the form of films and nearly always as oriented films. The films have usually been from 5 to 10 microns thick and are usually oriented by having been stretched from about 2 to 6 times the initial dimension in both the transverse and the longitudinal directions. Films generally eligible for this invention have a thickness of about 1 to 25 microns and it is believed that a thickness of about 1 to 5 microns is preferred.

DESCRIPTION OF PREFERRED EMBODIMENTS

Example 1

The primary matrix material is high density polyethylene with about 1.0 weight percent succinic acid groups grafted thereto and the electrically conductive particles are carbon. The primary matrix material is made in accordance with Example 1 of U.S. Pat. No. 4,026,967. The carbon is commercially available and can be any of several products.

To make the dispersion, the primary matrix material, in cubed form, is combined with an equal weight of a carbon black pigment and the combination is blended in a Banbury mill, and extruded into cubed form. Several dispersions are prepared using carbon pigments of the following particle sizes:

|  | Specific area ($m^2/g$) | Size (nm) |
| --- | --- | --- |
| (1) | 36 | 19 |
| (2) | 319 | 16 |
| (3) | 543 | 14 |
| (4) | 560 | 13 |

Carbons (1), (2), and (3) can be obtained from Cities Service Co., Columbian Chemical Division, 3200 W. Market St., Akron, Ohio 44313, under the respective trade names of Raven C, Raven 3500, and Raven 7000; and carbon (4) can be obtained from Cabot Corp., 125 High St., Boston, Massachusetts, under the trade name of Black Pearl 1300.

The secondary matrix material is polyethylene terephthalate with an intrinsic viscosity of about 0.6.

Primary dispersion is combined with secondary matrix material, in cubed form, such that the combination is 8 weight percent primary dispersion.

The combination is blended in a vented, twin-screw extruder equipped with screws for kneading action and extruded, as disclosed by U.S. Pat. No. 2,823,421, into a cast film about 120 microns thick. The cast film is stretched to three times its original dimension in, both, the transverse direction and the longitudinal direction and is then heat set in accordance with the process taught in U.S. Pat. No. 2,823,421.

For purposes of comparison, there are also made: a film having the primary matrix material dispersed in the secondary matrix material without any electrically conductive particles; and film having 5 weight percent of the carbon dispersed directly in the secondary matrix material without any primary matrix material. A film of unblended polyethylene terephthalate is also made for comparison.

Each of the films is tested at 50° C. for Dielectric Constant and Dissipation Factor at 1K Hertz. Dielectric Constant and Dissipation Factors are determined according to ASTM D-150. Results are as follows:

| Film | Dielectric Constant | Dissipation Factor (%) |
| --- | --- | --- |
| (1) | 5.0 | 0.33 |
| (2) | 5.6 | 0.29 |
| (3) | 6.8 | 0.36 |
| (4) | 7.5 | 0.28 |
| No Carbon | 3.5 | 0.21 |
| Clear Film | 3.4 | 0.25 |
| Carbon Only | 4.2 | 0.30 |

Test capacitors are made from the above films by metallizing the films and winding them with enough turns to yield a capacitor of 15 nanofarads. The capacitors so wound are flattened at 80° C. and 8 $kg/cm^2$ to minimize effects of entrained air. Test control capacitors are made, in the same way to the same value, using the clear film from above.

The test capacitors made from films of this invention exhibited a dielectric constant of about 3.8 at 25° C. and 1K Hertz while the test control capacitors exhibited a dielectric constant, at those conditions, of about 2.88.

Example 2

In this Example, the primary and secondary matrix materials are the same as in Example 1. The electrically conductive particle material is carbon having a specific area of 14 $m^2/g$ and size of 0.1 to 0.5 microns sold by Monsanto Industrial Chemicals Co., 800 N. Lindbergh Blvd., St. Louis, Missouri 63166.

Primary dispersions are made at several concentrations of carbon and those dispersions are blended into the secondary matrix material to be 8 weight percent of the complete compound dispersion.

Films are made and tested as in Example 1 with results as follows:

| Primary Dispersion Concentration | Carbon Conc. in Film | Dielectric Constant | Dissipation Factor |
| --- | --- | --- | --- |
| 50% carbon | 4.0% | 4.5 | 0.4 |
| 40% carbon | 3.2% | 4.6 | 0.3 |
| 30% carbon | 2.4% | 3.4 | 0.4 |

Example 3

In this Example, the primary and secondary matrix material are the same as in Example 1. The electrically conductive particle material is the carbon of Example 2.

The primary dispersion is made using equal weight of primary matrix material and electrically conductive particles; and compound dispersions are made by blending several concentrations of primary dispersions into the secondary matrix material.

Films are made and tested as in Example 1 with results as follows:

| Primary Dispersion in Total (%) | Carbon Conc. in Film | Dielectric Constant | Dissipation Factor |
| --- | --- | --- | --- |
| 0 | — | 3.3 | 0.3 |
| 2 | 1% | 3.7 | 0.3 |
| 4 | 2% | 3.8 | 0.3 |
| 6 | 3% | 4.1 | 0.3 |
| 8 | 4% | 4.2 | 0.4 |
| 10 | 5% | 4.7 | 0.4 |

-continued

| Primary Dispersion in Total (%) | Carbon Conc. in Film | Dielectric Constant | Dissipation Factor |
|---|---|---|---|
| 12 | 6% | 4.7 | 0.5 |

Example 4

In this Example, a variety of primary matrix materials are used with a variety of electrically conductive particles. The secondary matrix material is polyethylene terephthalate and similar results are expected for other polyester secondary matrix materials.

The combining and blending of materials and the preparation of films is the same as disclosed in Example 1.

(a) The matrix materials are the same as those of Example 1 except that there is only 0.4 weight percent succinic acid groups grafted onto the high density polyethylene of the primary matrix material. The electrically conductive particle material is that of Example 2. The film is stretched 2X in the transverse direction and 5X in the longitudinal direction. For comparison, films are prepared using several concentrations of primary matrix material, with and without the electrically conductive particles.

The films are tested at 25° C. using 100 Hertz and the results are as follows:

| Primary Dispersion Concentration | Carbon Conc. in Film | Dielectric Constant | Dissipation Factor |
|---|---|---|---|
| 0 | 0 | 3.0 | 0.31 |
| 10 | 0 | 3.2 | 0.23 |
| 7 | 2.9 | 4.0 | 0.28 |
| 14 | 5.8 | 4.5 | 0.31 |

(b) The primary matrix material is a blend of two weight parts of an elastomer of ethylene, propylene, and 1,4-hexadiene and one weight part of that elastomer having about 1.8 weight percent of succinic acid groups grafted thereto. The electrically conductive particle material is that of Example 2. Equal parts of the conductive particle material and the primary matrix material are blended together and the resultant primary dispersion is blended with the secondary matrix material at a concentration of 10 weight percent. Films made from that compound dispersion exhibited a dielectric constant of 4.6 and a dissipation factor of 0.39 at 25° C. and 1K Hertz.

(c) Primary matrix material of polypropylene having a melt index of about 4.0 is blended with equal parts of the electrically conductive particles of Example 2 and that is blended with the secondary matrix material at a concentration of 10 weight percent. Films made from that compound dispersion exhibit a dielectric constant of 4.5 and a dissipation factor of 0.17.

(d) When a random copolymer of ethylene and propylene, with a melt index of about 3.8, is substituted for the polypropylene of (c), above, films made from the compound dispersion exhibit a dielectric constant of 4.5 and a dissipation factor of 0.2.

(e) Three weight parts of a primary matrix material of a polyester copolymer including isophthalic and terephthalic groups is blended with one weight part of the electrically conductive particles of Example 2 and that is blended with the secondary matrix material at a concentration of 16 weight percent. The primary matrix material is sold by Goodyear Tire & Rubber Co., Akron, Ohio 44316 under the trade name of Vytel. Films made from that compound dispersion exhibit a dielectric constant 4.0 and a dissipation factor of 1.0. When the concentration of primary dispersions in the compound dispersion is 32 weight percent, films made from the compound dispersions exhibit a dielectric constant of 4.8 and a dissipation factor of 1.1.

We claim:

1. A compound dispersion comprising:
   (i) electrically conductive carbon particles 0.01 to 20 microns in average diameter;
   (ii) a polyolefin having the carbon particles evenly distributed therein to yield a primary dispersion of about 25 to 75 weight percent carbon particles and the remainder polyolefin; and
   (iii) a polyester made from dicarboxylic acids or esterforming derivatives thereof and glycols and substantially immiscible with the polyolefin of the primary dispersion, containing less than about 5 weight percent of the carbon particles, and having the primary dispersion evenly distributed therein to yield the compound dispersion of about 5 to 20 weight percent primary dispersion and the remainder polyester.

2. The compound dispersion of claim 1 wherein the polyolefin is alkylcarboxyl-substituted polyolefin.

3. The compound dispersion of claim 1 in the form of a film.

4. The film of claim 3 oriented by stretching at least two times the initial dimension in both the transverse and the longitudinal directions.

5. The compound dispersion of claim 1 wherein the individual primary dispersion domains have an average spherical equivalent diameter of about 0.1 to 20 microns.

6. The compound dispersion of claim 1 wherein the polyester is polyethylene terephthalate.

7. The compound dispersion of claim 2 in the form of a film.

8. The film of claim 7 oriented by stretching at least two times the initial dimension in both the transverse and the longitudinal directions.

9. The compound dispersion of claim 2 wherein the polyester is polyethylene terephthalate.

10. The compound dispersion of claim 9 in the form of a film.

11. The film of claim 10 oriented by stretching at least two times the initial dimension in both the transverse and the longitudinal directions.

* * * * *